United States Patent
Sakaki et al.

(10) Patent No.: US 7,325,645 B2
(45) Date of Patent: Feb. 5, 2008

(54) POWER STEERING DEVICE

(75) Inventors: Toshimitsu Sakaki, Kanagawa (JP);
Chiharu Nakazawa, Kanagawa (JP);
Tadaharu Yokota, Kanagawa (JP);
Masakazu Kurata, Yokohama (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 11/076,099

(22) Filed: Mar. 9, 2005

(65) Prior Publication Data
US 2005/0150710 A1    Jul. 14, 2005

Related U.S. Application Data

(62) Division of application No. 10/134,489, filed on Apr. 30, 2002, now Pat. No. 6,880,668.

(30) Foreign Application Priority Data

May 17, 2001 (JP) ............................. 2001-147310
Oct. 3, 2001 (JP) ............................. 2001-307034

(51) Int. Cl.
*B62D 5/06* (2006.01)

(52) U.S. Cl. .................. 180/441; 180/421; 180/422

(58) Field of Classification Search ............... 180/417, 180/421, 422, 432, 433, 434, 439, 441, 442
See application file for complete search history.

(56) References Cited

U.S. PATENT DOCUMENTS 3,683,166 A    8/1972 Bowles
3,878,763 A *  4/1975 Lang .................... 91/391 R
3,991,846 A * 11/1976 Chichester et al. .......... 180/403
4,082,147 A    4/1978 Wolff et al.
4,285,267 A    8/1981 Bacardit
4,325,286 A *  4/1982 Lang ......................... 91/373
4,580,651 A    4/1986 Adams
4,723,475 A    2/1988 Burk
4,914,913 A *  4/1990 St. Germain et al. ........ 60/384
5,147,007 A    9/1992 Kahrs et al.
5,279,380 A *  1/1994 Frank et al. ................. 180/422

(Continued)

FOREIGN PATENT DOCUMENTS

JP         57-201767         12/1982

(Continued)

*Primary Examiner*—Lesley D. Morris
*Assistant Examiner*—Daniel Yeagley
(74) *Attorney, Agent, or Firm*—Foley & Lardner LLP

(57) ABSTRACT

A first fluid passage extends from a first outlet/inlet port of a hydraulic pump to a first work chamber of a power cylinder, and a second fluid passage extends from a second outlet/inlet port of the pump to a second work chamber of the power cylinder. A switch system switches the role of the first and second outlet/inlet ports in accordance with a turning direction of a steering wheel. Flow control mechanisms are respectively incorporated with the first and second fluid passages, so that a controlled flow of hydraulic fluid from the hydraulic pump to the first or second work chamber and vice versa are appropriately carried out thereby providing the driver with a comfortable steering feeling. A bypass arrangement may be provided between the first and second fluid passages to deal with a residual pressure that would be remained in the first or second work chamber when the hydraulic pump is under inoperative condition.

8 Claims, 7 Drawing Sheets

U.S. PATENT DOCUMENTS

| | | | |
|---|---|---|---|
| 5,289,894 A * | 3/1994 | Yoshiyuki | 180/422 |
| 5,947,228 A | 9/1999 | Rolando | |
| 6,152,254 A * | 11/2000 | Phillips | 180/422 |
| 6,209,677 B1 * | 4/2001 | Bohner et al. | 180/406 |
| 6,267,040 B1 | 7/2001 | Sonoda et al. | |
| 6,279,675 B1 * | 8/2001 | Bohner et al. | 180/403 |
| 6,568,499 B2 | 5/2003 | Nakazawa et al. | |
| 7,086,494 B2 * | 8/2006 | Yokota et al. | 180/441 |
| 7,128,182 B2 * | 10/2006 | Otaki et al. | 180/441 |
| 2003/0178241 A1 | 9/2003 | Yokota et al. | |
| 2007/0028606 A1 * | 2/2007 | Misunou et al. | 60/384 |

FOREIGN PATENT DOCUMENTS

| | | |
|---|---|---|
| JP | 59-118569 | 7/1984 |
| JP | 59-128055 A | 7/1984 |
| JP | 2-049109 Y2 | 12/1990 |
| JP | 6-016145 A | 1/1994 |
| JP | 8-2493 A | 1/1996 |
| JP | 2003-72568 A | 3/2003 |

* cited by examiner

POWER STEERING DEVICE

The present application is a divisional application of U.S. application Ser. No. 10/134,489, filed Apr. 30, 2002, now U.S. Pat. No. 6,880,668, issued Apr. 30, 2002, the entire contents of which are incorporated herein by reference.

BACKGROUND OF THE INVENTION

1. Field of the Invention

The present invention relates in general to power steering devices for wheeled motor vehicles, and more particularly to the power steering devices of a type which provide a driver with a comfortable steering feeling.

2. Description of the Related Art

In order to clarify the task of the present invention, two power steering devices hitherto proposed will be briefly described with reference to corresponding drawings.

FIG. 9 shows a power steering device disclosed in Laid-Open Japanese Patent Application (Tokkai-sho) 59-118569. The device of this publication generally comprises a steering shaft 2 having a steering wheel 1 connected thereto. An output shaft 3 is connected to steering shaft 2 through a torsion spring (not shown). Output shaft 3 has a pinion 4b connected to a lower end thereof. Pinion 4b is meshed with a rack 4a provided at one end of a piston rod 5. Piston rod 5 has a piston 10 slidably received in a power cylinder 6. Due to provision of piston 10, the interior of power cylinder 6 is divided into first and second work chambers 11a and 11b, as shown. Denoted by numeral 8 is a reversible hydraulic pump driven by an electric motor 7. Pump 8 has two outlet/inlet ports 9a and 9b which are fluidly connected to first and second work chambers 11a and 11b through first and second fluid passages 12a and 12b, respectively. First and second fluid passages 12a and 12b have a bypass passage 15 therebetween. Bypass passage 15 has an electromagnetic switch valve 16 mounted thereon. Denoted by numeral 13 is a torque sensor which detects a steering torque produced when steering shaft 2 is turned. Denoted by numeral 14 is an electronic controller which, based on an information signal from torque sensor 13, controls electric motor 7 and electromagnetic switch valve 16. That is, by controller 14, a rotation direction and rotation speed of electric motor 7 are controlled, so that an actual outlet port 9a or 9b of pump 8 is selected and a delivery pressure by actual outlet port 9a or 9b is controlled. When the detected steering torque is smaller than a predetermined value, controller 14 controls switch valve 16 to open bypass passage 15, while when the torque is larger than the predetermined valve, 10 controller 14 controls valve 16 to close bypass passage 15. Thus, when, under cruising of an associated motor vehicle, steering wheel 1 is turned by a driver and thus torque sensor 13 detects the steering torque, controller 14 controls electric motor 7 and switch valve 16 in the above-mentioned manner. With this, first and second work chambers 11a and 11b of power cylinder 6 are fed with controlled fluid pressure to shift piston 10 in a certain direction, so that the steering operation by the driver is assisted.

Another power steering device is disclosed in Laid-Open Japanese Patent Application (Tokkai-sho) 57-201767. The device of this publication is similar in construction to that of the above-mentioned publication. However, in the device of 57-201767 publication, in place of the above-mentioned electromagnetic switch valve 16, a hydraulically actuated switch valve is employed which is disposed on the bypass passage. Furthermore, respective pilot passages extend from the two outlet/inlet ports of the reversible hydraulic pump to the switch valve. In operation, the switch valve opens and closes the bypass passage in accordance with a magnitude of pilot pressures produced in the pilot passages. When, under cruising of an associated motor vehicle at a middle or high speed, the torque sensor detects substantially no steering torque, the controller stops the motor of the hydraulic pump causing the bypass passage to open. Under this condition, the two work chambers of the power cylinder are communicated with each other, so that steering of the vehicle is carried out without aid of the power of the power cylinder.

SUMMARY OF THE INVENTION

However, due to inherent constructions, the above-mentioned two power steering devices have failed to provide the driver with a satisfied steering feeling.

An object of the present invention is to provide a power steering device which suppresses or at least minimizes a transmission of pressure pulsation of a hydraulic pump to a power cylinder, thereby providing a driver with a comfortable steering feeling.

Another object of the present invention is to provide a power steering device which appropriately deals with a residual pressure that would be remained in a power cylinder when a hydraulic pump is off, which provides a driver with a comfortable manual steering feeling.

More specifically, according to a first aspect of the present invention, there is provided a power steering device for a motor vehicle, which comprises a steering wheel adapted to be connected to a couple of steered road wheels; a power cylinder; a piston slidably disposed in said power cylinder to divide the interior of said power cylinder into first and second work chambers; a transmission mechanism for transmitting movement of said piston to said couple of steered road wheels; a reversible hydraulic pump having a first outlet/inlet port and a second outlet/inlet port; an electric motor reversibly driving said reversible hydraulic pump in accordance with a turning direction of said steering wheel; a first fluid passage extending from said first outlet/inlet port to said first work chamber; a second fluid passage extending from said second outlet/inlet port to said second work chamber; a first valve arranged in each of said first and second fluid passages, said first valve being constructed to permit a fluid flow from said reversible hydraulic pump toward said power cylinder when a hydraulic pressure produced by said hydraulic pump is larger than that in the corresponding work chamber by a given pressure; and a second valve arranged in each of said first and second fluid passages in parallel with said first valve, said second valve being constructed to permit only a fluid flow from the work chamber toward said reversible hydraulic pump.

According to a second aspect of the present invention, there is provided a power steering device for a motor vehicle, which comprises a steering mechanism including a steering wheel; a hydraulic power mechanism for assisting operation of the steering mechanism in accordance with movement of the steering wheel, the hydraulic power mechanism including a power cylinder, a piston slidably disposed in the power cylinder to divide the interior of the power cylinder into first and second work chambers and a transmission mechanism for transmitting movement of the piston to the steering mechanism to assist the same; a reversible hydraulic pump having a first outlet/inlet port and a second outlet/inlet port; a first fluid passage extending from the first outlet/inlet port to the first work chamber; a second fluid passage extending from the second outlet/inlet port to the second work chamber; a switch system for switching the role of the first and second outlet/inlet ports in accordance with a turning direction of the steering wheel; a first flow control arrangement arranged between the first and second fluid passages, the first flow control arrangement selectively connecting and disconnecting the first and second fluid passages in accordance with a magnitude of a hydraulic pressure produced by the hydraulic pump, and the first flow control arrangement connecting the first and second fluid passages when the hydraulic pump is under inoperative condition; and a second flow control arrangement arranged between the first and second fluid passages, the second flow control arrangement permitting a flow of residual pressure in one of the first and second work chambers toward the other of the first and second work chambers when the hydraulic pump is under inoperative condition.

Other objects and advantages of the present invention will become apparent from the following description when taken in conjunction with the accompanying drawings.

DETAILED DESCRIPTION OF THE EMBODIMENTS

Figure 1:
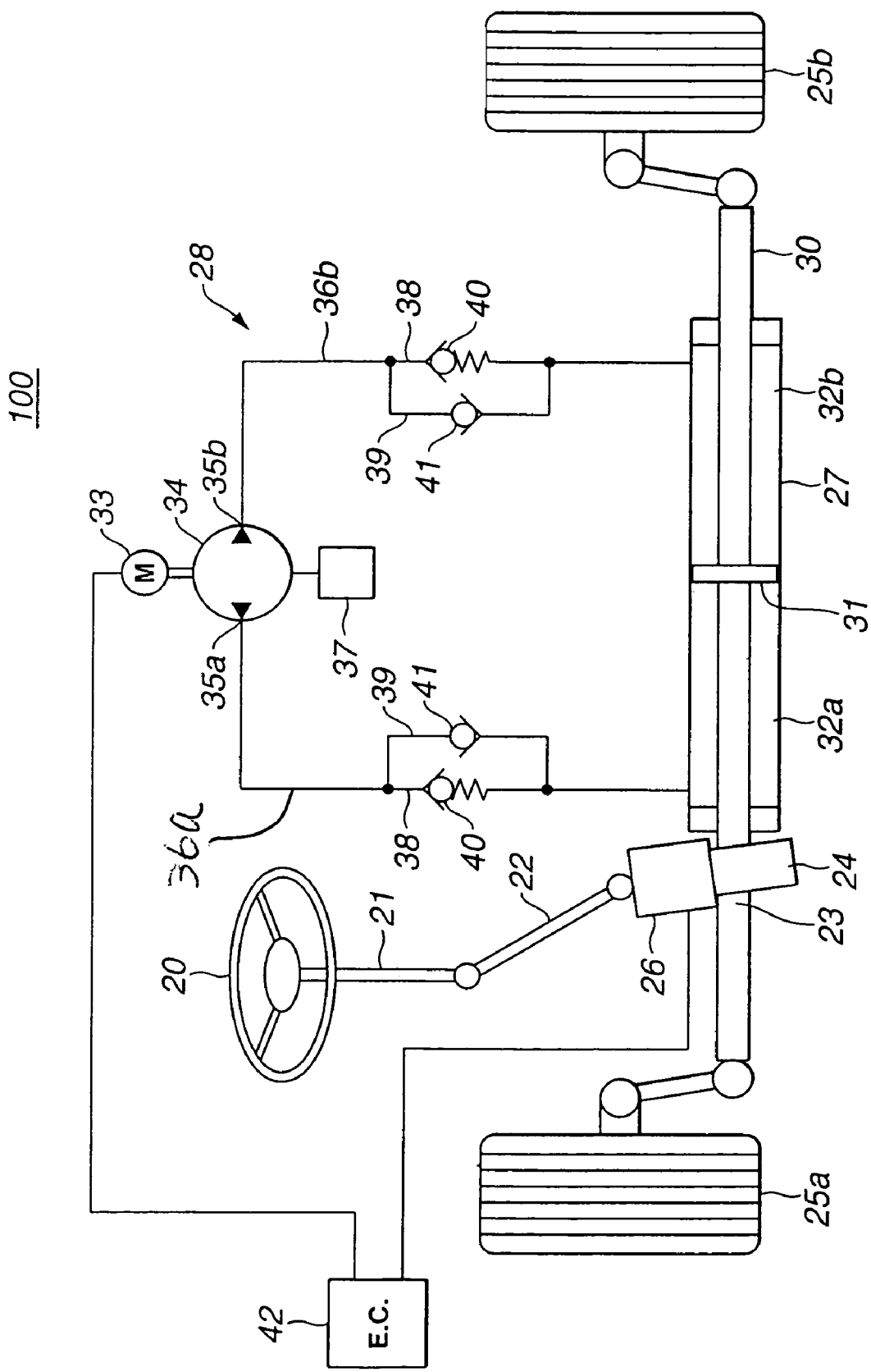
FIG. 1 is a schematic diagram of a power steering device which is a first embodiment of the present invention.

Referring to FIGS. 1 to 4, particularly FIG. 1, there is schematically shown a power steering device 100 which is a first embodiment of the present invention.

As is seen from FIG. 1, power steering device 100 comprises a steering mechanism including a steering shaft 21 which has a steering wheel 20 connected thereto. An output shaft 22 is connected to steering shaft 21 to rotate therewith. Output shaft 22 has a pinion 24 connected to a lower end thereof. Pinion 24 is meshed with a rack 23 provided at one end of a piston rod 30. A condition sensor 26 is connected to output shaft 22 to detect both a steering torque produced when steering shaft 21 is turned and a bouncing force applied thereto from a road through steered road wheels 25a and 25b. Piston rod 30 has a piston 31 which is slidably received in a power cylinder 27. Due to provision of piston 31, the interior of power cylinder 27 is divided into first and second work chambers 32a and 32b. Thus, piston 31 and power cylinder 27 constitute part of a hydraulic power mechanism. Furthermore, piston rod 30 and parts (no numerals) arranged between piston rod 30 and each of steered road wheels 25a and 25b constitute part of a transmission mechanism.

Denoted by numeral 28 is a hydraulic circuit which feeds first and second work chambers 32a and 32b of power cylinder 27 with a controlled hydraulic pressure.

Hydraulic circuit 28 comprises a reversible hydraulic pump 34 driven by an electric motor 33, a first fluid passage 36a connecting one outlet/inlet port 35a of pump 34 to first work chamber 32a of power cylinder 27, a second fluid passage 35b connecting the other outlet/inlet port 35b to second work chamber 32b of power cylinder 27 and a reservoir tank 37 filling up circuit 28 with a hydraulic fluid through pump 34. Each of first and second fluid passages 36a and 36b comprises a charging passage 38 and a discharging passage 39 which are arranged in parallel with each other. As shown, each charging passage 38 has a first valve 40 which is arranged to allow only a charging flow of hydraulic fluid from pump 34 toward power cylinder 27, while each discharging passage 39 has a second valve 41 which is arranged to allow only a discharging flow of the hydraulic fluid from power cylinder 27 toward pump 34. Electric motor 33 is controlled by an electronic controller 42 to which an information signal produced by condition sensor 26 is fed. One control effected by controller 42 is to switch the role of outlet/inlet ports 35a and 35b of pump 34 in accordance with a turning direction of steering wheel 20.

First valve 40 is arranged to open charging passage 38 when a hydraulic pressure from pump 34 is higher than a predetermined higher value, while second valve 41 is arranged to open discharge passage 39 when a hydraulic pressure in work chamber 32a or 32b is higher than a predetermined lower value.

Figure 2:
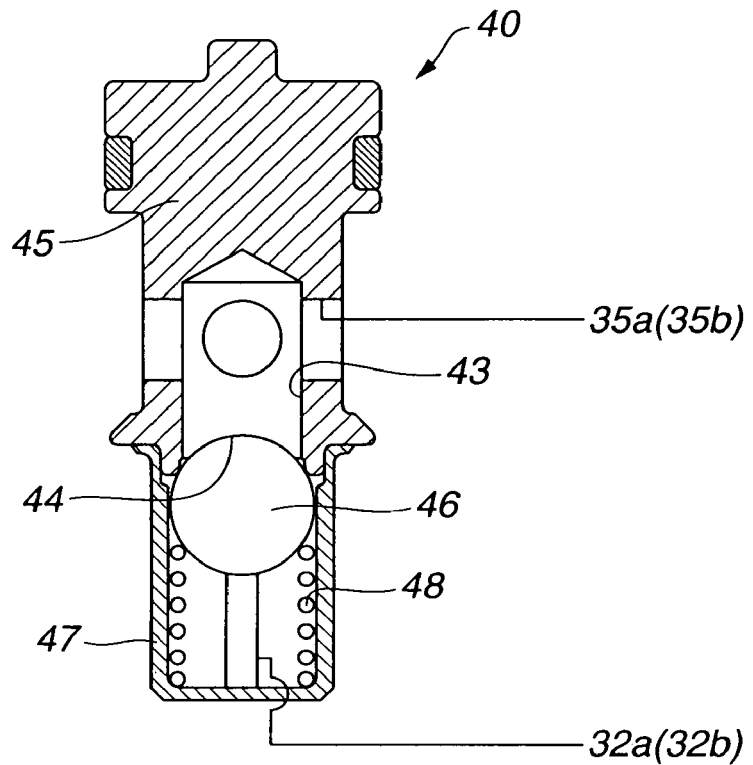
FIG. 2 is a sectional view of a first valve employed in the power steering device of the first embodiment.
Figure 3:
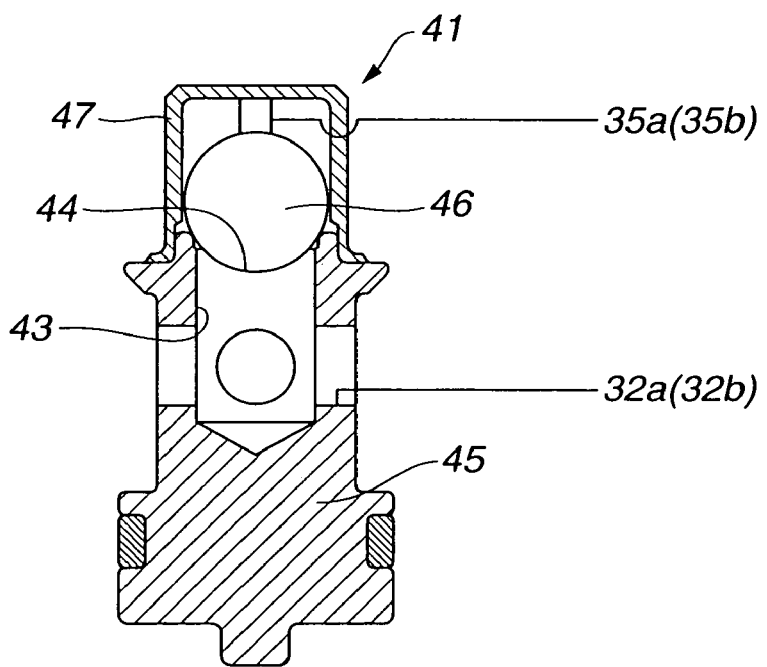
FIG. 3 is a sectional view of a second valve employed in the power steering device of the first embodiment.

First and second valves 40 and 41 are shown in detail in FIGS. 2 and 3, respectively.

As is shown in FIG. 2, first valve 40 comprises a cylindrical body 45 having a bore cylindrical bore 43 with a valve seat 44, a cylindrical retainer 47 coaxially connected to body 45, a spherical valve element 46 slidably received in retainer 47 and a spring 48 set in retainer 47 to bias spherical valve element 46 toward valve seat 44. Cylindrical bore 43 is connected to the outlet/inlet port 35a or 35b of pump 34, and the interior of retainer 47 is connected to work chamber 32a or 32b of power cylinder 27. Due to the biasing force of spring 48, spherical valve element 46 is pressed against valve seat 44 thereby to block a communication between bore 43 and the interior of retainer 47. However, as has been mentioned hereinabove, when hydraulic pressure in bore 43 becomes larger than the predetermined higher value, that is, sum of a hydraulic pressure in retainer 47 and biasing force of spring 48, spherical valve element 46 is released from valve seat 44 thereby to open the communication.

As is shown in FIG. 3, second valve 41 is similar in construction to the above-mentioned first valve 40. However, in second valve 41, there is no means corresponding to spring 48 of first valve 40. However, as shown in the drawing, upon assembly, second valve 40 is arranged upside down having spherical valve element 46 put on valve seat 44 by its own weight. The interior of retainer 47 is connected to outlet/inlet port 35a or 35b of pump 34, and bore 43 is connected to work chamber 32a or 32b of power cylinder 27. Due to its own weight, valve element 46 is put on valve seat 44 thereby to block the communication between the interior of retainer 47 and bore 43. However, as has been mentioned hereinabove, when hydraulic pressure in bore 43 becomes higher than the predetermined lower value, that is, sum of a hydraulic pressure in retainer 47 and the weight of valve element 46, valve element 46 is released from valve seat 44 thereby to open the communication.

As is easily known, the opening pressure "L" of first valve 40 can be easily controlled or varied by changing spring 48 having a different spring constant.

Figure 4:
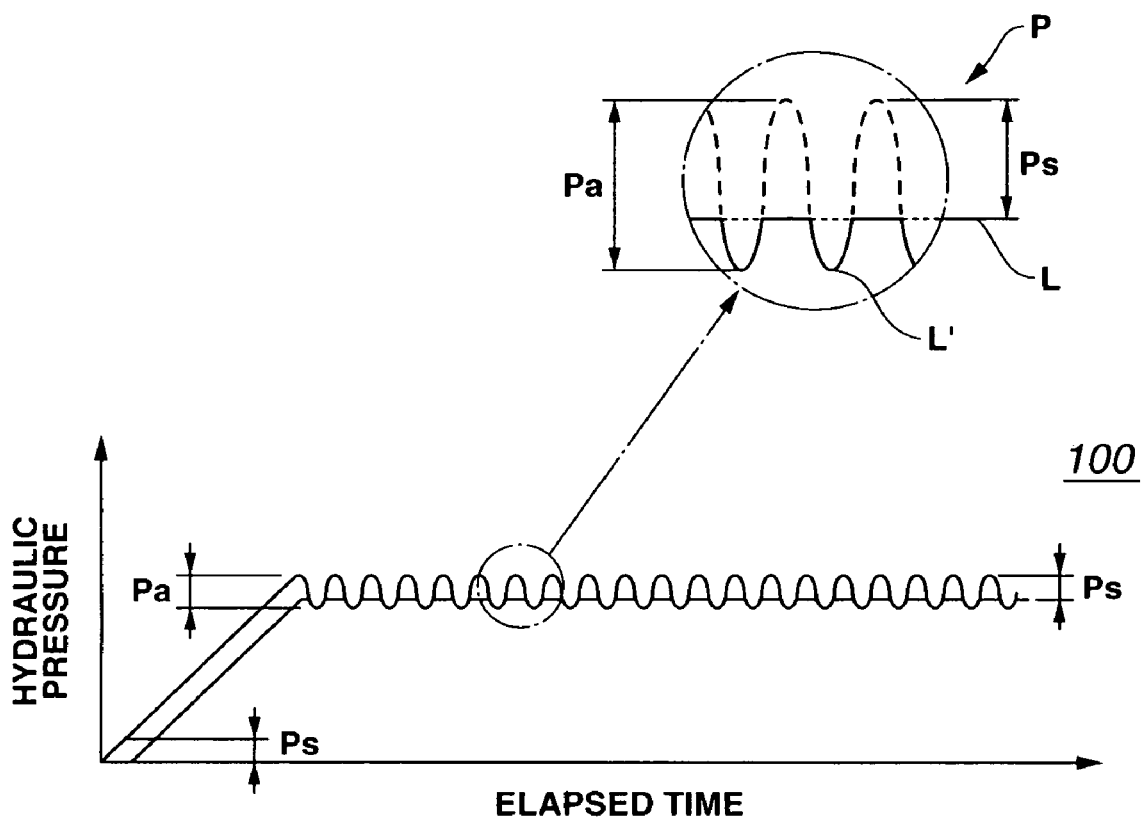
FIG. 4 is a graph showing a pressure characteristic exhibited by the power steering device of the first embodiment.

As is seen from the graph of FIG. 4, in power steering device 100 of the first embodiment, the opening pressure "L" of first valve 40 is set slightly higher than the lowest level "L'" of a pulse fluctuation range "Pa" that appears when the hydraulic pressure from hydraulic pump 34 exhibits its saturated higher level. That is, an allowable fluctuation range "Ps" of the opening pressure "L" of first valve 40 is set slightly smaller than the pulse fluctuation range "Pa" of the pulse pressure from hydraulic pump 34.

In the following, operation of power steering device 100 will be described with reference to FIG. 1.

When, under running of the vehicle, steering wheel 20 is turned, condition sensor 26 detects a steering torque of steering wheel 20 and a bouncing force from a road through steered road wheels 25a and 25b and feeds electronic controller 42 with information signals representing such information. Based on such information signals, electronic controller 42 controls a rotation direction and rotation speed of electric motor 33 thereby to adjust the steering assisting power produced by power cylinder 27. With this, the steering operation by the driver is assisted.

In case wherein, under cruising with steering wheel 20 keeping a certain steering angle, a counterforce applied to the vehicle body from the road through steered road wheels 25a and 25b and a power produced by power cylinder 27 are kept substantially balanced, electronic controller 42 controls hydraulic pump 34 (more specifically, electric motor 33) at a lower speed or intermittently to compensate a fluid leakage from power cylinder 27.

Under this condition, a pressure pulsation is inevitably produced by hydraulic pump 34. If such pulsation is transmitted to first and second work chambers 32a and 32b of power cylinder 27 through first and second fluid passages 36a and 36b like in the device of the above-mentioned 59-118569 publication, the transmitted pulsation would cause deterioration in steering feeling of the driver.

However, in the invention 100, as is seen from FIG. 4, once the hydraulic pressure from hydraulic pump 32 is raised up to a certain level, the hydraulic pressure shows a constant level that is higher than the pressure in work chamber 32a or 32b by a degree corresponding to the allowable fluctuation range "Ps" of first valve 40. Under this condition, the pulsation from pump 34 is not transmitted to work chamber 32a or 32b.

More specifically, as is understood from the graph of FIG. 4, once the hydraulic pressure from pump 34 reaches a peak "P" of pulsation pressure, the pressure is kept higher than the pressure in work chamber 32a or 32b until the time when the pressure becomes lowered to the level "L" that is smaller than the peak "P" by the fluctuation range "Ps" of first valve 40. Accordingly, in this case, the first valve 40 has a dead zone of a size corresponding to the fluctuation range "Ps", and thus, as long as the hydraulic pressure from pump 34 is within the dead zone, second valve 41 is not opened, that is, it never occurs that the fluid flows from work chamber 32a or 32b of power cylinder 27 toward pump 34. Thus, under this condition, the pressure in work chamber 32a or 32b is kept constant.

However, when the hydraulic pressure from pump 34 becomes lowered to the level "L'" that is smaller than the level "L", that is, when the pressure from pump 34 becomes out of the dead zone, the pressure in work chamber 32a or 32b becomes higher than the pressure from pump 34. Upon this, second valve 41 becomes opened causing a fluid flow from work chamber 32a or 32b toward pump 34, and thus the pressure in work chamber 32a or 32b is lowered together with the pulsating pressure from pump 34. When thereafter the pressure from pump 34 is increased again, the pressure in work chamber 32a or 32b is increased to the level "L" and thus kept constant at this level "L".

As is described hereinabove, in power steering device 100 of this first embodiment, the component of pulsation produced by hydraulic pump 34 directed toward power cylinder 27 is almost cut, and thus, undesired vibration of power cylinder 27 caused by such pulsation is suppressed or at least minimized. That is, the driver is given a satisfied steering feeling.

The advantages of power steering device 100 will be more clearly understood from the following description directed to the power steering device of the above-mentioned former publication (viz., 59-118569).

Figure 9:
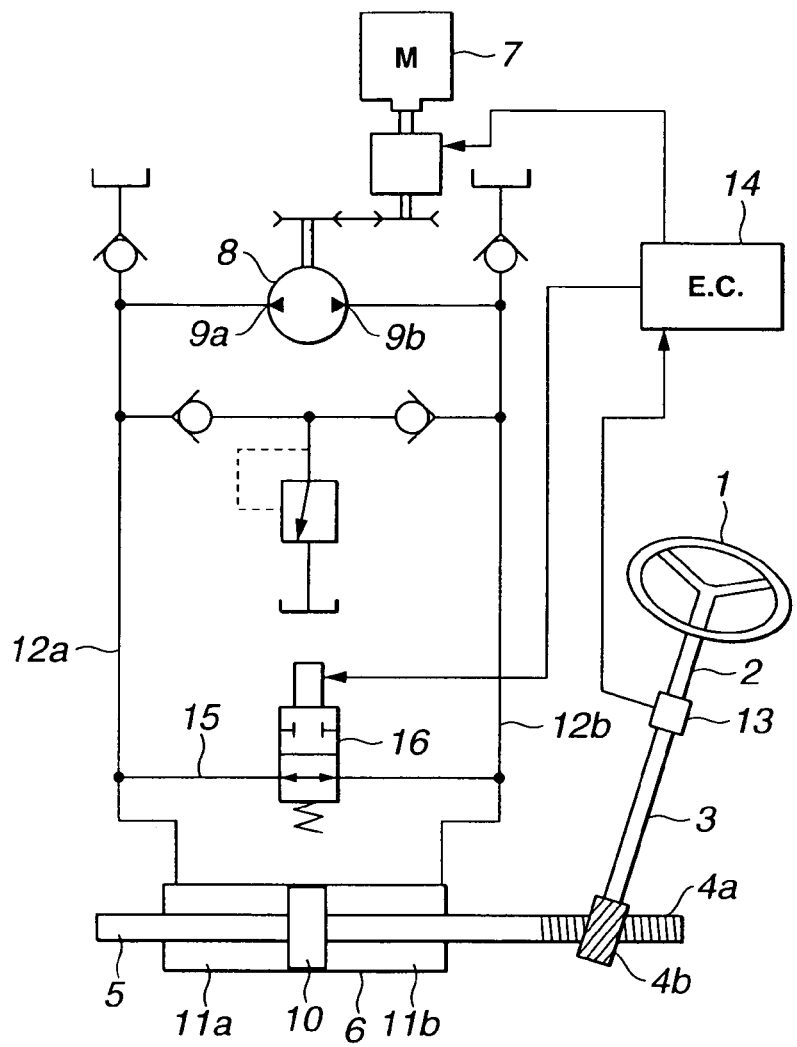
FIG. 9 is a schematic diagram of a power steering device of a related art.
Figure 10:
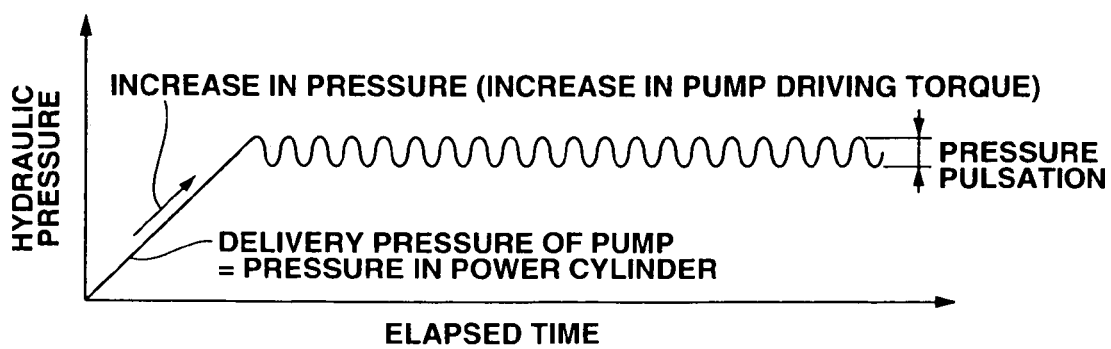
FIG. 10 is a graph showing a pressure characteristic exhibited by the power steering device of the related art.

That is, as is seen from FIG. 9, in case of the former publication, two outlet/inlet ports 9a and 9b of pump 8 are directly communicated with first and second work chambers 11a and 11b by first and second fluid passages 12a and 12b. However, this arrangement tends to induce the following condition. That is, in case wherein, under cruising with steering wheel 1 keeping a certain steering angle, a counterforce applied to the vehicle body from a road through steered road wheels and a power produced by power cylinder 6 are kept almost balanced, hydraulic pump 8 is forced to run at a lower speed compensating a fluid leakage from power cylinder 6. However, in this case, as is seen from the graph of FIG. 10, a pressure pulsation inevitably produced by hydraulic pump 8 at such low speed operation is transmitted to power cylinder 6 and thus to steering wheel 1, which deteriorates the steering feeling of the driver.

Figure 5:
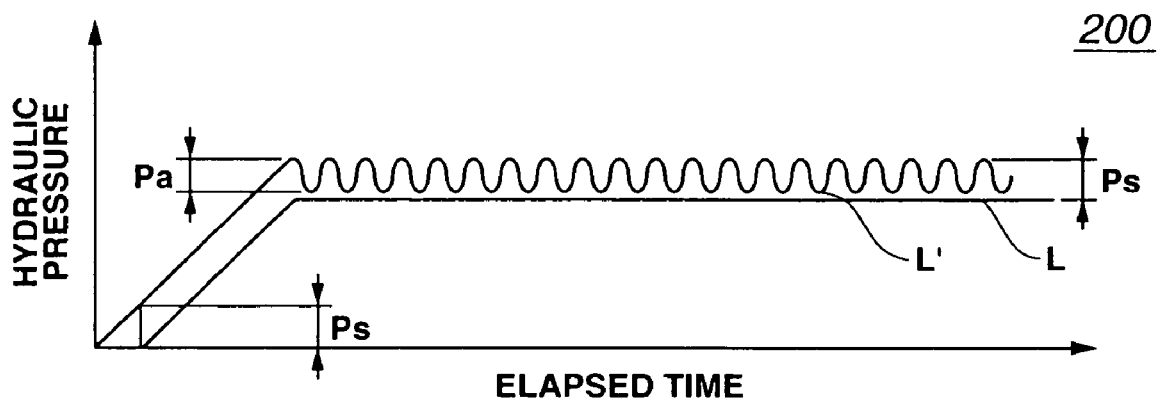
FIG. 5 is a graph similar to FIG. 4, but showing a pressure characteristic exhibited by a power steering device of a second embodiment of the present invention.

FIG. 5 shows the pressure characteristics exhibited by a power steering device 200 of a second embodiment of the present invention.

As shown, in this second embodiment 200, the opening pressure "L" of first valve 40 is set slightly lower than the lowest level "L'" of the pulse fluctuation range "Pa" that appears when the hydraulic pressure from pump 34 exhibits its saturated higher level. That is, an allowable fluctuation range "Ps" of the opening pressure "L" of the first valve is set slightly larger than the pulse fluctuation range "Pa" of the pulse pressure from hydraulic pump 34.

Accordingly, in this second embodiment 200, the dead zone that induces an inoperative condition of second valve 41 is larger than the pulse fluctuation range "Pa", and thus, the pressure in work chamber 32a or 32b is not affected by the pulsation from pump 34. Thus, the steering feeling by the driver is much improved.

Figure 6:
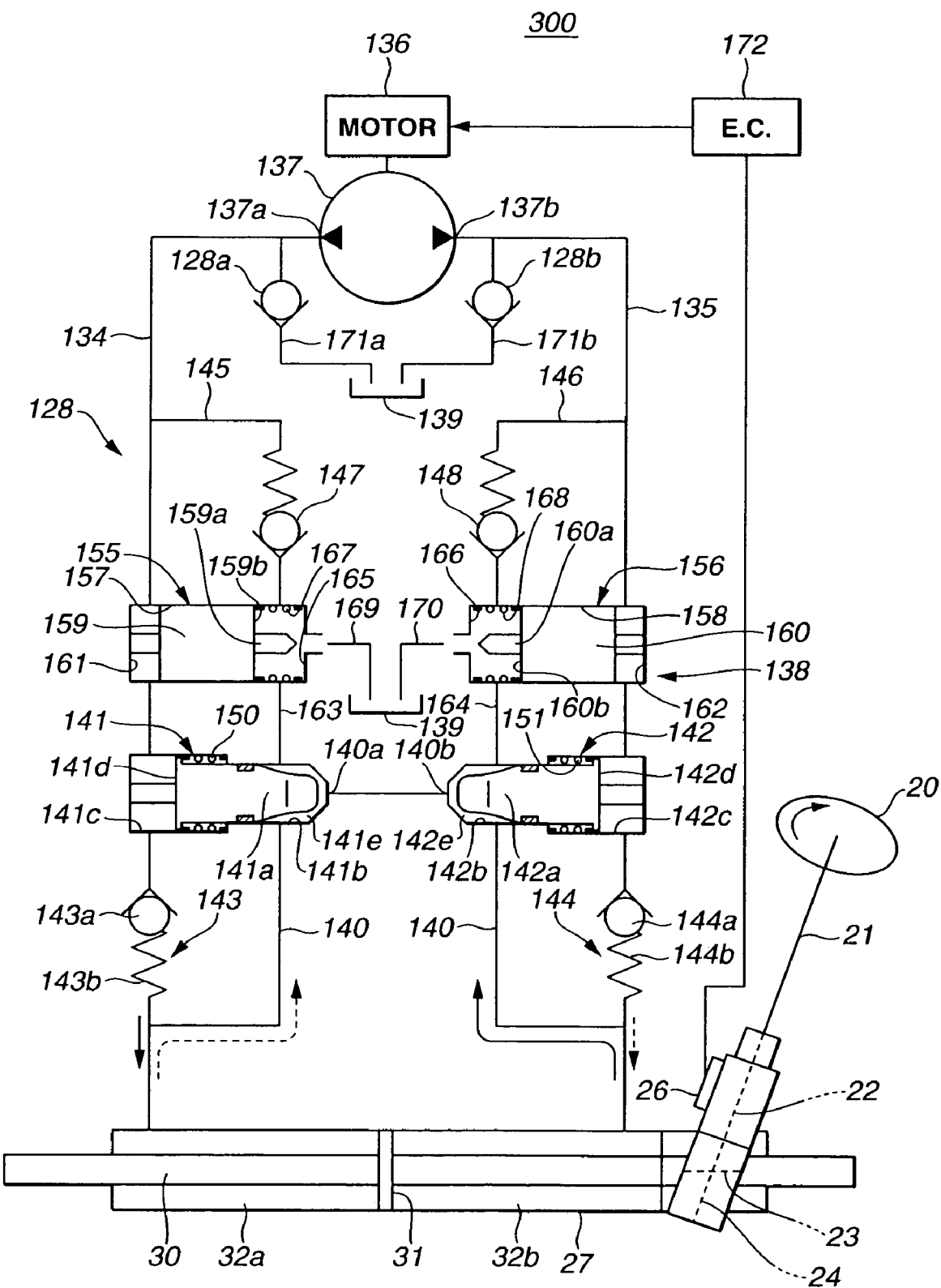
FIG. 6 is a schematic diagram of a power steering device which is a third embodiment of the present invention.

Referring to FIG. 6, there is shown a power steering device 300 which is a third embodiment of the present invention.

As shown, power steering device 300 of this third embodiment comprises a steering wheel 20, a steering shaft 21, an output shaft 22, a pinion 24, a rack 23, a condition sensor 26, a power cylinder 27, a piston rod 30 and a piston 31, which are arranged in substantially the same way as that mentioned in the part of first embodiment 100.

Denoted by numeral 128 is a hydraulic circuit which feeds first and second work chambers 32a and 32b of power cylinder 27. with a controlled hydraulic pressure.

Hydraulic circuit 128 generally comprises a reversible hydraulic pump 137 which is driven by an electric motor 136, a first fluid passage 134 which connects one outlet/inlet port 137a of pump 137 to first work chamber 32a of power cylinder 27, a second fluid passage 135 which connects the other outlet/inlet port 137b of pump 137 to second work chamber 32b of power cylinder 27, a communication mechanism 138 which is arranged between first and second fluid passages 134 and 135 to connect first and second work chambers 32a and 32b of power chamber 27 under a given condition and a reservoir tank 139 which reserves a hydraulic fluid and connects two outlet/inlet ports 137a and 137b through respective check valves 128a and 128b.

Communication mechanism 138 comprises first and second control valves 143 and 144 which are respectively disposed in first and second fluid passages 134 and 135 in a manner to permit only a fluid flow from pump 137 toward power cylinder 27, a bypass passage 140 which extends between first fluid passage 134 downstream of first control valve 143 and second fluid passage 135 downstream of second control valve 144, and first and second puppet valves 141 and 142 which are disposed in bypass passage 140 in series in a manner to open or close bypass passage 140.

Communication mechanism 138 further comprises first and second communication passages 145 and 146 which bypass first and second control valves 143 and 144. Each of first and second communication passages 145 and 146 is equipped with a check valve 147 or 148 which permits only a fluid flow from power cylinder 27 toward oil pump 137.

As shown in the drawing, each of puppet valves 141 and 142 comprises a valve bore 141b or 142b formed in a part of bypass passage 140 and a generally conical valve element 141a or 142a which is slidably and hermetically received in valve bore 141b or 142b. For the hermetically sealing, each valve element 141a or 142a has an annular sealing member disposed thereabout. As shown, each valve element 141a or 142a is arranged to open and close an opening 140a or 140b of bypass passage 140. A base portion of each valve element 141a or 142a is exposed to a pressure chamber 141c or 142c to which the hydraulic pressure is applied from pump 137 through first or second fluid passage 134 or 135. As shown, each valve bore 141b or 142b has a communication chamber 141e or 142e communicated with opening 140a or 140b. A coil spring 150 or 151 is employed to bias valve element 141a or 142a toward pressure chamber 141c or 142c.

Each valve element 141a or 142a has a first pressure receiving area 141d or 142d exposed to pressure chamber 141c or 142c, and a second pressure receiving area (no numeral) exposed to communication chamber 141e or 142e. As shown, first pressure receiving area 141d or 142d is larger than the second pressure receiving area.

Thus, each valve element 141a or 142a is moved forward or backward based on a difference between a force applied to first pressure receiving area 141d or 142d from the pressure in pressure chamber 141c or 142c and the sum of a force applied to the second pressure receiving area from the pressure in communication chamber 141e or 142e and the biasing force produced by coil spring 150 or 151. That is, when the force applied to first pressure receiving area 141d or 142d is larger than the sum, valve element 141a or 142a is shifted to close opening 140a or 140b thereby to close bypass passage 140, while, when the force applied to first pressure receiving area 141d or 142d is smaller than the sum, valve element 141a or 142a is shifted in the opposite direction to open opening 140a or 140b thereby to open bypass passage 140.

Each of first and second control valves 143 and 144 comprises a spherical valve element 143a or 144a which is arranged to open and close an opening led to pump 137, and a return spring 143b or 144b which biases valve element 143a or 144a in a direction to close opening. The spring constant of each return spring 143b or 144b is set sufficiently larger than that of spring 150 or 151 of first or second puppet valve 141 or 142 and that of a coil spring 167 or 168 of an after-mentioned residual pressure discharging valve 155 or 156.

As shown, first and second residual pressure discharging valves 155 and 156 are arranged near first and second puppet valves 141 and 142 at positions near pump 137. Each discharging valve 155 or 156 comprises a valve bore 157 or 158 which extends between first or second fluid passage 134 or 135 and first or second communication passage 145 or 146, a cylindrical valve element 159 or 160 which is slidably received in valve bore 157 or 158, a back pressure chamber 161 or 162 which is defined in valve bore 157 or 158 and communicated with first or second fluid passage 134 or 135, an introduction chamber 165 or 166 which is defined I valve bore 157 or 158 and communicated with communication chamber 141e or 142e of puppet valve 141 or 142 through a fluid passage 163 or 164, and spring 167 or 168 which is compressed in introduction chamber 165 or 166 to bias valve element 159 or 160 toward back pressure chamber 161 or 162. Introduction chamber 165 or 166 is communicated to the above-mentioned reservoir tank 139 through a discharge passage 169 or 170.

Each valve element 159 or 160 has a first pressure receiving area (no numeral) exposed to back pressure chamber 161 or 162 and a second pressure receiving area 159b or 160b exposed to introduction chamber 165 or 166. These first and second pressure receiving areas are the same in size, and second pressure receiving area 159b or 160b is larger than the second pressure receiving area (no numeral) exposed to communication chamber 141e or 142e of valve element 141a or 142a of the above-mentioned puppet valve 141 or 142. Each valve element 159 or 160 has a pin portion 159a or 160a which is sized to close discharge passage 169 or 170.

Thus, each valve element 159 or 160 is moved forward or backward to open or close discharge passage 169 or 170, based on a difference between a force applied to the first pressure receiving area from the pressure in back pressure chamber 161 or 162 and the sum of a force applied to second pressure receiving area 159b or 160b from the pressure in induction chamber 165 or 166 and the biasing force produced by coil spring 167 or 168. The spring constant of coil spring 167 or 168 is set larger than that of coil spring 150 or 151 of the above-mentioned puppet valve 141 or 142, and thus, the opening pressure of valve element 159 or 160 is smaller than that of valve element 141a or 142a of puppet valve 141 or 142.

Reservoir tank 139 reserves the hydraulic fluid discharged from residual pressure discharging valves 155 and 156 and feeds the fluid to hydraulic pump 137 through fluid feed passages 171a and 171b.

Electric motor 136 for reversibly driving hydraulic pump 137 is controlled by an electronic controller 172 which includes a micro-computer. Information signals from condition sensor 26 are fed to electronic controller 172 for controlling motor 136, which are a steering torque of steering wheel 20 and a bouncing force from the road through steered road wheels (not shown). Like in the above-mentioned first embodiment 100, one control effected by controller 172 is to switch the role of outlet/inlet ports 137a and 137b of pump 137 in accordance with a turning direction of steering wheel 20.

In the following, operation of power steering device 300 will be described with reference to FIG. 6.

When, under running of the vehicle, steering wheel 20 is turned rightward, that is, in a direction indicated by the arrow, controller 172 controls hydraulic pump 137 through motor 136 to run in a corresponding direction, that is, for example in a normal direction. Due to this operation of pump 137, pump 137 outputs from outlet/inlet port 137a a certain amount of pressurized hydraulic fluid to first fluid passage 134. Thus, the fluid flows, through back pressure chamber 161 of residual pressure discharging valve 155, pressure chamber 141c of puppet valve 141 and first control valve 143 pressing valve element 143a against return spring 143b, to first work chamber 32a of power cylinder 27.

That is, as has been described hereinabove, the spring constant of return spring 143b of first control valve 143 is set larger than that of spring 150 of first puppet valve 141 and that of coil spring 167 of residual pressure discharging valve 155. Thus, in a first stage of fluid feeding from pump 137, the pressure in back pressure chamber 161 of residual pressure discharging valve 155 and the pressure in pressure chamber 141c of puppet valve 141 are sufficiently large, so that respective valve elements 159 and 141a are moved rightward in the drawing to close discharge passage 169 and opening 140a of bypass passage 140. Accordingly, in the first stage of the fluid feeding from pump 137, as is indicated by a solid arrow, the fluid is directly applied to first work chamber 32a of power cylinder 27 through first fluid passage 134 without making a leakage toward second fluid passage 135 through bypass passage 140.

Under operation of pump 137, the hydraulic fluid in second work chamber 32b in power cylinder 27 is sucked into second fluid passage 135. However, in this case, as is indicated by a solid arrow, due to obstruction function of second control valve 144, the hydraulic fluid is led into bypass passage 140 connected to valve bore 142b of puppet valve 142 and led into induction chamber 166 of second residual pressure discharging valve 156 through communication chamber 142e of puppet valve 142 and fluid passage 164 and then led into second fluid passage 135 by opening check valve 148, and finally sucked into pump 137 from outlet/inlet port 137b.

Due to the above-mentioned fluid flow, piston 31 in power cylinder 27 is moved rightward assisting the rightward turning of steering wheel 20 by the driver.

When, after being turned rightward, steering wheel 20 is stopped and kept at a certain right position, electric controller 172 stops energization of electric motor 136, so that hydraulic circuit 128 becomes into a sealed up condition keeping the pressurized condition in first work chamber 32a of power cylinder 27.

When now steering wheel 20 is turned back leftward to a neutral position and further turned leftward, electronic controller 172 controls hydraulic pump 137 through motor 136 to run in the opposite direction.

Upon this, unlike the above-mentioned case, pump 137 outputs from the other outlet/inlet port 137b a certain amount of pressurized fluid from to second fluid passage 135. The fluid flows, through back pressure chamber 162 of residual pressure discharging valve 156 and pressure chamber 142c of puppet valve 142, to second control valve 144. Upon this, due to the obstruction function of valve element 144a biased by return spring 144b, the hydraulic pressure in back pressure chamber 162 and that in pressure chamber 142c are increased, so that respective valve elements 160 and 142a are moved leftward against the force of respective springs 168 and 151 closing discharge passage 170 and opening 140b of bypass passage 140. Accordingly, the hydraulic fluid from pump 137 opens valve element 144a of second control valve 144 against the force of return spring 144b and enters second work chamber 32b of power cylinder 27. At the same time, due to the suction function of pump 137 at outlet/inlet port 137a, the hydraulic fluid in first work chamber 32a of power cylinder 27 is led into first fluid passage 134 and as is indicated by a dotted arrow, into communication chamber 141e of puppet valve 141 and into introduction chamber 165 of residual pressure discharging valve 155 through fluid passage 163. Then, fluid opens check valve 147 and enters first fluid passage 134 through first communication passage 145 and is sucked into pump 137 from outlet/inlet port 137a.

Due to the above-mentioned fluid flow, piston 31 in power cylinder 27 is moved leftward thereby assisting the leftward turning of steering wheel 20 effected by the driver.

When, in case wherein the vehicle is subjected to a high speed straight running after turning, electronic controller 172 stops operation of hydraulic pump 137, no hydraulic pressure is produced in pressure chambers 141c and 142c of both puppet valves 141 and 142. Thus, valve elements 141a and 142b of these valves 141 and 142 are moved backward due to the biasing force of coil springs 150 and 151 thereby opening openings 140a and 140b of bypass passage 140. Thus, bypass passage 140 becomes opened thereby to connect first and second work chambers 32a and 32b of power cylinder 27.

Under this condition, steering power assist is not obtained because pump 137 is kept off. However, due to the connection between first and second work chambers 32a and 32b by bypass passage 140, the fluid flow between the two work chambers 32a and 32b, which is inevitably induced when steering wheel 20 is turned, is smoothly carried out. Thus, manual turning of steering wheel 20 is easily carried out by the driver.

In the case wherein hydraulic pump 137 is stopped, the hydraulic pressure in hydraulic circuit 128 becomes lowered causing puppet valves 141 and 142 and residual pressure discharging valves 155 and 156 to take their open conditions. Thus, first and second work chambers 32a and 32b of power cylinder 27 become communicated with each other through bypass passage 140.

However, if stopping of hydraulic pump 137 takes place before the hydraulic pressure in first or second fluid passage 134 or 135 is sufficiently lowered, it happens that puppet valve 141 or 142 fails to open. That is, in case wherein the vehicle is intended to run straightly just after the steering assisted mode, the driver turns steering wheel 20 toward the neutral position. Upon this, condition sensor 26 detects the steering torque and thus electronic controller 172 controls the operation of hydraulic pump 37. Accordingly, the hydraulic pressure kept fed to one of first and second fluid passages 134 and 135 is led to the other fluid passage thereby leveling the pressures in passages 134 and 135. Since condition sensor 26 is provided with a dead zone around the neutral position of steering wheel 20, detection of the steering torque by sensor 26 stops before the leveling of the pressures of the two fluid passages 134 and 135 is sufficiently made, and thus pump 137 is stopped. Accordingly, a certain residual pressure is left in hydraulic circuit 128. Due to this residual pressure, puppet valves 141 and 142 keep their close positions closing bypass passage 40.

In residual pressure discharging valve 155 or 156, the spring constant of spring 167 or 168 is appreciably large and second pressure receiving area 159b or 160b of valve element 159 and 160 is appreciably large. Thus, when substantially equal hydraulic pressure is applied to both back pressure chamber 161 or 162 and introduction chamber 165 or 166, valve element 159 or 160 is shifted backward by the force of spring 167 or 168 thereby opening discharge passage 169 or 170. With this, the hydraulic pressure in introduction chamber 165 or 166 becomes lowered.

Thus, the residual pressure led to bypass passage 140 is led through communication chamber 141e or 142e and fluid passage 163 or 164 to lower pressure introduction chamber 165 or 166. From this chamber 165 or 166, the fluid is returned to reservoir tank 139 through discharge passage 169 or 170.

Accordingly, the residual pressure in first or second work chamber 32a or 32b of power cylinder 27 can be sufficiently discharged to the outside, and thus steering wheel 20 can be smoothly and assuredly returned to the neutral position. That is, the driver is given a satisfied steering feeling.

The advantages of power steering device 300 will be more clearly understood from the following description directed to the power steering device of the above-mentioned latter publication (viz., 57-2017567).

That is, in the power steering device of the latter publication, when, after the associated motor vehicle is steered rightward or leftward, the vehicle is operated to run straightly, the torque sensor detects substantially no steering torque causing the hydraulic pump to turn off. However, in this case, due to a certain residual pressure left in one of the first and second fluid passages, turning the steering wheel (viz., steering shaft) back to its neutral position requires a remarkable operating force to the driver. More specifically, in the device of this publication, for avoiding too sensitive steering assist, the torque sensor is constructed to have a dead zone around the neutral position. Thus, when a detected steering torque becomes smaller than an upper level of the dead zone, the controller stops the hydraulic pump. However, in this case, a certain residual pressure is inevitably remained in one of the first and second fluid passages and thus the hydraulic valve on the bypass passage is kept off. Thus, the residual pressure affects the steering wheel providing the driver with uncomfortable steering feeling.

In third embodiment 300 of the invention, since the spring constant of spring 167 or 168 of residual pressure discharging valve 155 or 156 is larger than that of spring 150 or 151 of puppet valve 141 or 142, the closing condition of valve 155 or 156 takes place after puppet valve 141 or 142 assumes its closing condition. Thus, even when, under feeding of hydraulic pressure to first or second fluid passage 134 or 135, a part of the hydraulic fluid fed to first or second work chamber 32a or 32b of power cylinder 27 is discharged to reservoir tank 139 through discharge passage 169 or 170, the leakage of fluid to reservoir tank 139 can be minimized if the sectional area of discharge passage 169 or 170 is set sufficiently small relative to that of bypass passage 140.

Usage of puppet valves 141 and 142 each including as major parts valve element 141a or 142a, pressure chamber 141c or 142c, communication chamber 141e or 142e and spring 150 or 151 brings about a reduction of cost of power steering device 300 because of their simple and low cost construction.

Furthermore, because of the nature of puppet valves 141 and 142, power steering device 300 can exhibit a fail-safe operation even if a foreign thing happens to enter communication chamber 141e or 142e. That is, even in such case, open condition of bypass passage 140 is kept, so that manual operation of steering wheel 20 by driver is assured.

Usage of control valves 143 and 144 each including as major parts valve element 143a or 144a and return spring 143b or 144b brings about a low cost production of power steering device 300 because of their simple and low cost construction.

Figure 7:
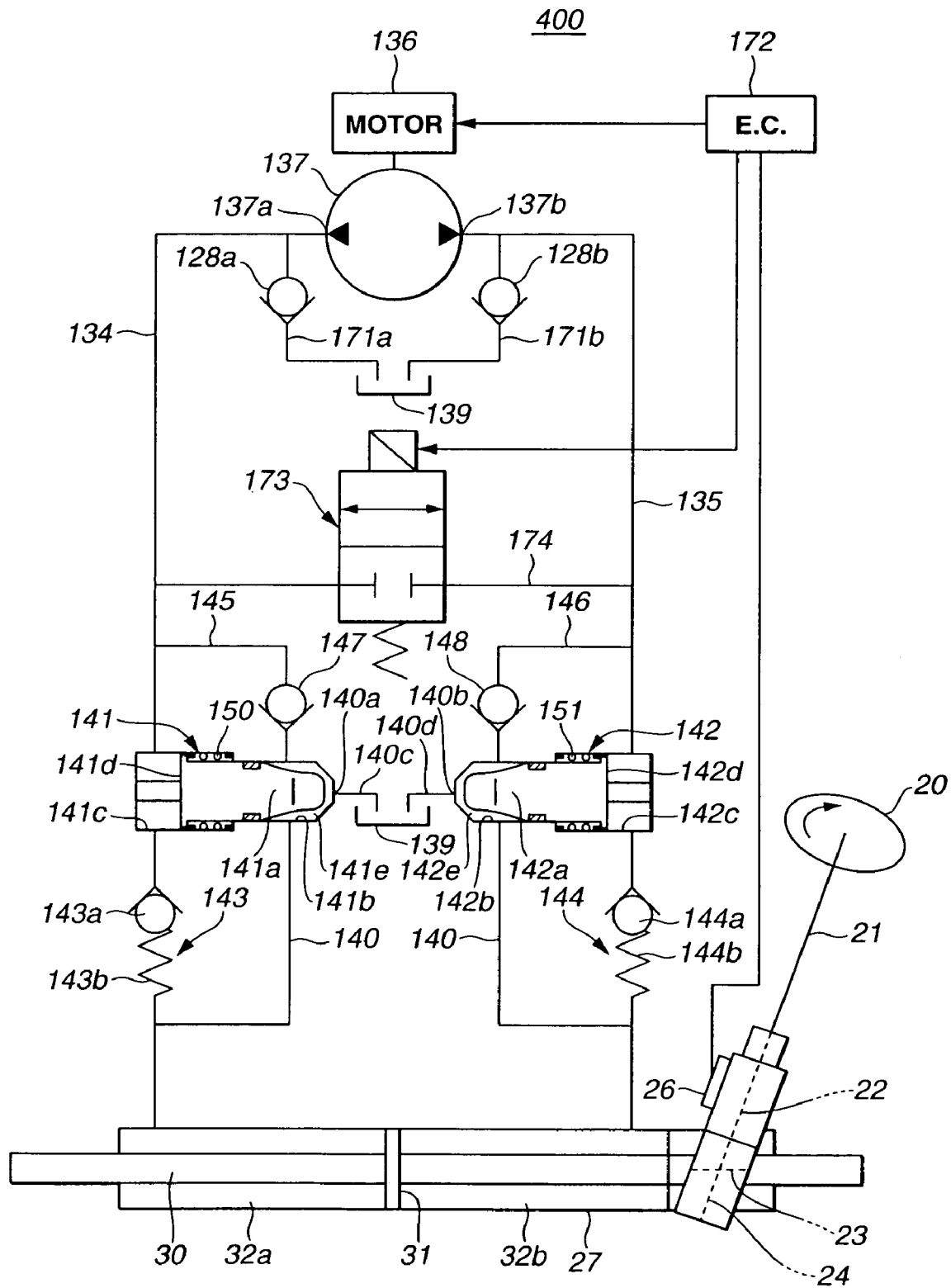
FIG. 7 is a view similar to FIG. 6, but showing a power steering device of a fourth embodiment of the present invention.
Figure 8:
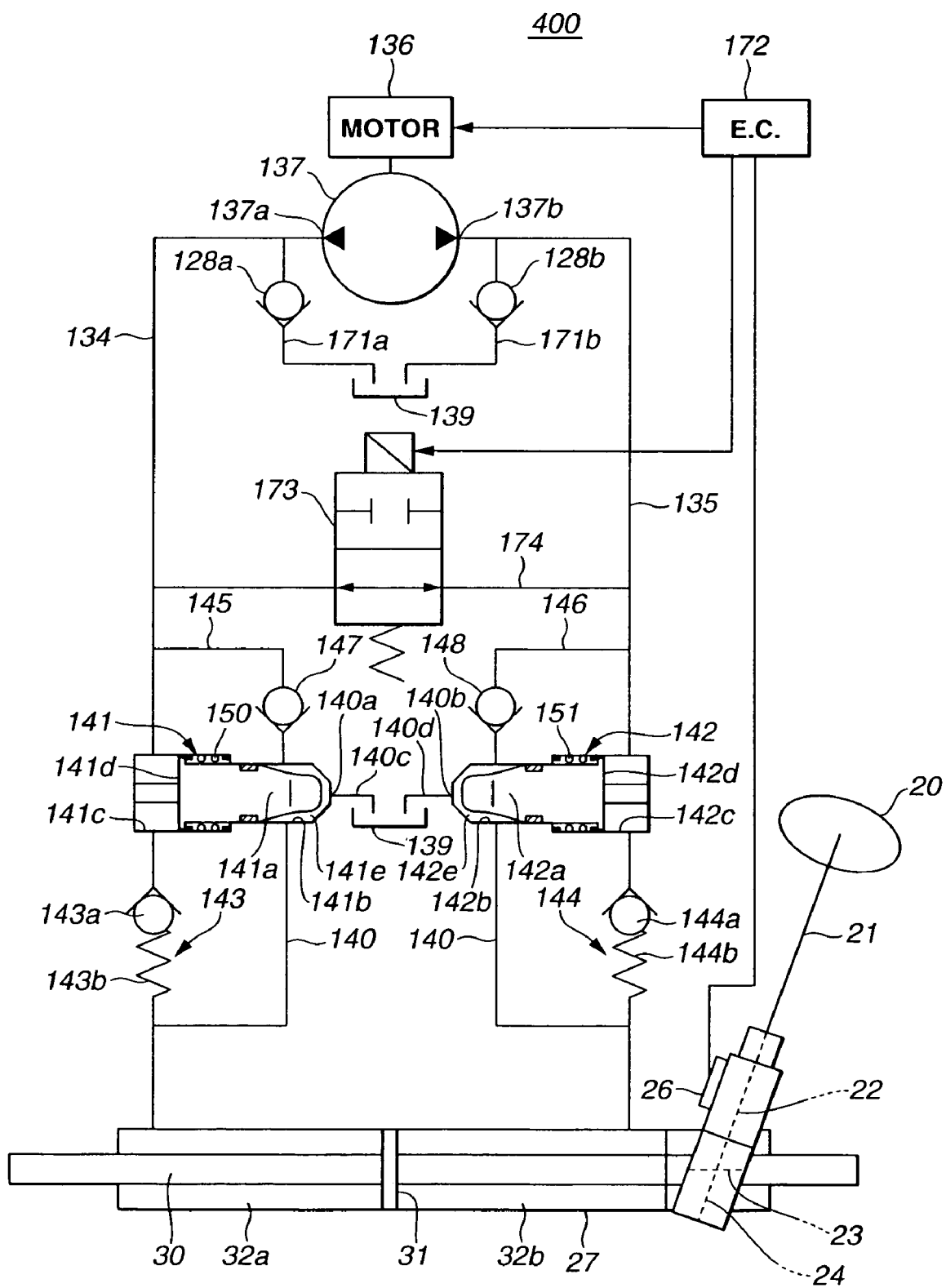
FIG. 8 is a view similar to FIG. 7, but showing a different condition of the power steering device of the fourth embodiment.

Referring to FIGS. 7 and 8, there is shown a power steering device 400 which is a fourth embodiment of the present invention.

Power steering device 400 of this fourth embodiment is similar in construction to device 300 of the above-mentioned third embodiment. Thus, in the following, only parts or portions that are different from those of third embodiment 300 will be described in detail, and substantially the same parts and portions are denoted by the same numerals.

As is seen from FIG. 7, in fourth embodiment 400, an electromagnetic valve 173 is used in place of discharging valves 155 and 156 of third embodiment 300.

More specifically, as shown in the drawing, bypass passage 140 is divided at a position between openings 140a and 140b thereof thereby to provide drain passages 140c and 140d which are led to reservoir tank 139. Drain passage 140c is connected to communication chamber 141e of first puppet valve 141 and the other drain passage 140d is connected to communication chamber 142e of second puppet valve 142. Communication chambers 141e and 142e are respectively connected to first and second fluid passages 134 and 135 through first and second communication passages 145 and 146. Each communication passage 145 or 146 has a check valve 147 or 148 disposed therein. Check valve 147 or 148 is arranged to permit only a fluid flow from the communication chamber 141e or 142e toward first or second fluid passage 134 or 135.

An additional bypass passage 174 extends between first and second fluid passages 134 and 135 in parallel with the above-mentioned bypass passage 140. As shown, additional bypass passage 174 is positioned nearer to hydraulic pump 137 than bypass passage 140 is.

Additional bypass passage 174 has the electromagnetic valve 173 operatively connected thereto. Valve 173 is of an ON/OFF type having an open position to open additional bypass passage 174 and a closed position to close the same. The ON/OFF operation of valve 173 is controlled by electronic controller 172 in an after-mentioned manner.

In the following, operation of power steering device 400 will be described with reference to FIGS. 7 and 8.

Under normal running of the vehicle, electronic controller 172 controls electromagnetic valve 173 to take OFF position as shown in FIG. 7. In this condition, right or left turning of steering wheel 20 by the driver is assisted by the power produced by power cylinder 27, like in the case of the above-mentioned third embodiment 300.

That is, if steering wheel 20 is turned rightward for example, a certain amount of pressurized hydraulic fluid is led into first work chamber 32a of power cylinder 27, and at the same time, the hydraulic fluid in second work chamber 32b of power cylinder 27 is led into hydraulic pump 137. This fluid flow moves piston 31 in power cylinder 27 rightward thereby assisting the rightward turning of steering wheel 20 by the driver. It is to be noted that flowing of the hydraulic fluid from pump 137 toward first work chamber 32a of power cylinder 27 increases the pressure in pressure chamber 141c of puppet valve 141 thereby moving valve element 159 to close opening 140a of drain passage 140c. Thus, thereafter, feeding the fluid to first work chamber 32a is more effectively carried out. Of course, during such fluid feeding flowing toward first work chamber 32a, the fluid in second work chamber 32b is forced to flow through bypass passage 140, communication chamber 142e, second communication passage 146 and second fluid passage 135 to pump 137. During this, part of fluid toward pump 137 is drained to reservoir tank 139 through drain passage 140d.

While, if steering wheel 20 is turned leftward under normal running of the vehicle, the fluid flow in first and second fluid passages 134 and 135 becomes opposite to that in the above-mentioned case. Thus, the left turning of steering wheel 20 by the driver is assisted by power cylinder 27.

As is described hereinabove, during the steering assist operation of device 400, electromagnetic valve 173 keeps its OFF position closing additional bypass passage 174. Thus, pumping loss of hydraulic pump 137 can be suppressed.

When the vehicle is running straightly at a high speed and thus condition sensor 26 detects no steering torque, electronic controller 172 stops hydraulic pump 137. Under this condition, the hydraulic pressure in pressure chamber 141c or 142c of puppet valve 141 or 142 becomes low and thus corresponding valve element 141a or 142a connects bypass passage 140 with reservoir tank 139. However, if, in such case, a certain residual pressure is kept in first or second fluid passage 134 or 135 and first or second work chamber 32a or 32b of power cylinder 27, the pressure reduction in pressure chamber 141c or 142c becomes insufficient. This phenomenon tends to induce that valve element 141a or 142a closes opening 140a or 140b of 10 bypass passage 140 blocking the connection of pressure chamber 141c or 142c with reservoir tank 139. However, upon this, by sensing the insufficient pressure reduction in pressure chamber 141c or 142c by a pressure sensor (not shown), electronic controller 172 controls electromagnetic valve 173 to take ON position as is shown in FIG. 8. Upon this, the residual pressure in first or second fluid passage 134 or 135 and first or second work chamber 32a or 32b flows toward second or first fluid passage 135 or 134 through additional bypass passage 174. Thus, manual operation of steering wheel 20 is assuredly made by the driver.

If hydraulic pump 173 fails to operate, a sensor (not shown) associated with pump 173 feeds electronic controller 172 with a corresponding instruction signal. Upon this, controller 172 controls electromagnetic valve 173 to take ON position thereby opening additional bypass passage 174. Thus, fluid flow between first and second work chambers 32a and 32b is freely made and thus manual steering of steering wheel 20 by the driver is assuredly carried out.

Usage of electromagnetic valve 173 brings about a low cost production of power steering device 400 because of simple construction of valve 173.

Although the invention has been described above with reference to the embodiments of the invention, the invention is not limited to such embodiments as described above. Various modifications and variations of such embodiments may be carried out by those skilled in the art, in light of the above description.

What is claimed is:

1. A power steering device for a motor vehicle, comprising:
   a steering mechanism including a steering wheel;
   a hydraulic power mechanism for assisting operation of said steering mechanism in accordance with movement of said steering wheel, said hydraulic power mechanism including a power cylinder, a piston slidably disposed in said power cylinder to divide an interior of said power cylinder into first and second work chambers and a transmission mechanism for transmitting movement of said piston to said steering mechanism to assist the steering mechanism;
   a reversible hydraulic pump having a first outlet/inlet port and a second outlet/inlet port;
   a first fluid passage extending from said first outlet/inlet port to said first work chamber;
   a second fluid passage extending from said second outlet/inlet port to said second work chamber;
   a switch system for switching the role of said first and second outlet/inlet ports in accordance with a turning direction of said steering wheel;
   a couple of first flow control valves respectively incorporated with said first and second fluid passages such that fluid connection between the first outlet/inlet port to the first work chamber is accomplished through one of said first flow control valves and fluid connection between the second outlet/inlet port to said second work chamber is accomplished through the other of said first flow control valves, the one of said first flow control valves selectively fluidly connecting and disconnecting said first fluid passage and a reservoir tank in accordance with a magnitude of a hydraulic pressure produced by said hydraulic pump, and fluidly connecting said first fluid passage and said reservoir tank when said hydraulic pump is under inoperative condition, the other of said first flow control valves selectively fluidly connecting and disconnecting said second fluid passage and said reservoir tank in accordance with the magnitude of a hydraulic pressure produced by said hydraulic pump, and fluidly connecting said second fluid passage and said reservoir tank when said hydraulic pump is under inoperative condition; and
   a flow control arrangement arranged between said first and second fluid passages, said flow control arrangement permitting a flow of residual pressure in one of said first and second work chambers toward the other of said first and second work chambers when said hydraulic pump is under inoperative condition.

2. A power steering device as claimed in claim 1, in which each of said first flow control valves is constructed to operate in accordance with a differential pressure between a hydraulic pressure produced by said hydraulic pump and that appearing in corresponding one of said first and second work chambers.

3. A power steering device as claimed in claim 1, further comprising:
   a first check valve arranged to permit only a fluid flow from said reservoir tank toward said first outlet/inlet port of said hydraulic pump; and
   a second check valve arranged to permit only a fluid flow from said reservoir tank toward said second outlet/inlet port of said hydraulic pump.

4. A power steering device as claimed in claim 1, in which each of said first flow control valves comprise first and second valve chambers, wherein the first valve chamber allows fluid communication between an outlet/inlet port of the pump to a work chamber and the second valve chamber allows fluid communication between a fluid passage and the reservoir tank.

5. A power steering device for a motor vehicle, comprising:
   a steering mechanism;
   a hydraulic power mechanism for assisting operation of the steering mechanism, the hydraulic power mechanism including a power cylinder, a piston slidably disposed in the power cylinder to divide an interior of the power cylinder into first and second work chambers and a transmission mechanism for transmitting movement of the piston to the steering mechanism to assist the steering mechanism;

a reversible hydraulic pump having a first outlet/inlet port and a second outlet/inlet port;

a first fluid passage extending from the first outlet/inlet port to the first work chamber;

a second fluid passage extending from the second outlet/inlet port to the second work chamber;

a switch system for switching the role of the first and second outlet/inlet ports in accordance with a turning direction of the steering mechanism;

a first flow control valve located in the first fluid passage for permitting a fluid connection between the first outlet/inlet port to the first work chamber, wherein the first flow control valve selectively fluidly connects and disconnects the first fluid passage and a reservoir tank in accordance with a magnitude of a hydraulic pressure produced by the hydraulic pump, and fluidly connects the first fluid passage and the reservoir tank when the hydraulic pump is under inoperative condition;

a second flow control valve located in the second fluid passage for permitting a fluid connection between the second outlet/inlet port to the second work chamber, wherein the second control valve selectively fluidly connects and disconnects the second fluid passage and the reservoir tank in accordance with the magnitude of a hydraulic pressure produced by the hydraulic pump, and fluidly connects the second fluid passage and the reservoir tank when the hydraulic pump is under inoperative condition; and a flow control arrangement arranged between the first and second fluid passages, the flow control arrangement permitting a flow of residual pressure in one of the first and second work chambers toward the other of the first and second work chambers when the hydraulic pump is under inoperative condition.

6. A power steering device as claimed in claim 5, in which the first flow control valve comprises first and second valve chambers, wherein the first valve chamber allows fluid communication between the first outlet/inlet port of the pump to the first work chamber and the second valve chamber allows fluid communication between the first fluid passage and the reservoir tank.

7. A power steering device as claimed in claim 5, in which the second flow control valve comprises first and second valve chambers, wherein the first valve chamber allows fluid communication between the second outlet/inlet port of the pump to the second work chamber and the second valve chamber allows fluid communication between the second fluid passage and the reservoir tank.

8. A power steering device for a motor vehicle, comprising:

a steering mechanism;

a hydraulic power mechanism for assisting operation of the steering mechanism, the hydraulic power mechanism including a power cylinder, a piston slidably disposed in the power cylinder to divide an interior of the power cylinder into first and second work chambers and a transmission mechanism for transmitting movement of the piston to the steering mechanism to assist the steering mechanism;

a reversible hydraulic pump having a first outlet/inlet port and a second outlet/inlet port;

a first fluid passage extending from the first outlet/inlet port to the first work chamber;

a second fluid passage extending from the second outlet/inlet port to the second work chamber;

a switch system for switching the role of the first and second outlet/inlet ports in accordance with a turning direction of the steering mechanism;

a first flow control valve comprising first and second parallel chambers, wherein the first parallel chamber is incorporated in the first fluid passage, wherein the first flow control valve selectively fluidly connects and disconnects the first fluid passage and a reservoir tank via the second parallel chamber in accordance with a magnitude of a hydraulic pressure produced by the hydraulic pump, and fluidly connects the first fluid passage and the reservoir tank via the second parallel chamber when the hydraulic pump is under inoperative condition;

a second flow control valve comprising third and fourth parallel chambers, wherein the third parallel chamber is incorporated in the second fluid passage, wherein the second control valve selectively fluidly connects and disconnects the second fluid passage and the reservoir tank via the fourth parallel chamber in accordance with the magnitude of a hydraulic pressure produced by the hydraulic pump, and fluidly connects the second fluid passage and the reservoir tank via the fourth parallel chamber when the hydraulic pump is under inoperative condition; and a flow control arrangement arranged between the first and second fluid passages, the flow control arrangement permitting a flow of residual pressure in one of the first and second work chambers toward the other of the first and second work chambers when the hydraulic pump is under inoperative condition.

* * * * *